United States Patent [19]

Shu et al.

[11] Patent Number: 5,211,232
[45] Date of Patent: May 18, 1993

[54] IN-SITU SILICA CEMENTATION FOR PROFILE CONTROL DURING STEAM INJECTION

[75] Inventors: Paul Shu, Cranbury, N.J.; Craig H. Phelps, Bakersfield, Calif.; Ricky C. Ng, Dallas, Tex.

[73] Assignee: Mobil Oil Corporation, Fairfax, Va.

[21] Appl. No.: 810,649

[22] Filed: Dec. 19, 1991

[51] Int. Cl.$^5$ .................... E21B 33/138; E21B 43/24; E21B 43/243

[52] U.S. Cl. .................... 166/261; 166/270; 166/272; 166/292; 166/293

[58] Field of Search ............... 166/270, 272, 292, 293, 166/294, 295, 700, 261

[56] References Cited

U.S. PATENT DOCUMENTS

| | | | |
|---|---|---|---|
| 2,402,588 | 6/1946 | Andresen. | |
| 2,747,670 | 5/1956 | King et al. | 166/292 X |
| 3,012,405 | 12/1961 | Caron | 166/293 |
| 3,306,355 | 2/1967 | Maly | 166/292 |
| 3,342,262 | 9/1967 | King et al. | 166/292 |
| 3,805,893 | 4/1974 | Sarem | 166/270 |
| 3,918,521 | 11/1975 | Snavely, Jr. et al. | 166/272 |
| 3,965,986 | 6/1976 | Christopher | 166/292 |
| 4,440,227 | 4/1984 | Holmes | 166/261 |
| 4,479,894 | 10/1984 | Chen et al. | 252/8.554 |
| 4,489,783 | 12/1984 | Shu | 166/272 |
| 4,513,821 | 4/1985 | Shu | 166/273 |
| 4,660,640 | 4/1987 | Hoskin et al. | 166/270 |
| 4,669,542 | 6/1987 | Venkatesan | 166/258 |
| 4,804,043 | 2/1989 | Shu et al. | 166/263 |
| 4,834,180 | 5/1989 | Shu | 166/270 |

*Primary Examiner*—George A. Suchfield
*Attorney, Agent, or Firm*—A. J. McKillop; G. W. Hager; C. A. Malone

[57] ABSTRACT

A method for controlling the profile of a formation where temperatures higher than 200° F. are encountered. Initially, an aqueous solution of an alkali metal hydroxide, ammonium hydroxide or organoammonium hydroxide is injected into a zone of greater permeability in a formation. Thereafter, a spacer volume of a water miscible organic solvent is injected into said zone. Afterwards, a water-miscible organic solvent containing an alkylpolysilicate is injected into the greater permeability zone. A silica cement is formed in-situ thereby substantially closing off the higher permeability zone to fluid flow. Thereafter, a steam-flooding, water-flooding, carbon dioxide stimulation or fire-flooding EOR operation is commenced in a lower permeability zone.

23 Claims, 1 Drawing Sheet

IN-SITU SILICA CEMENTATION FOR PROFILE CONTROL DURING STEAM INJECTION

FIELD OF THE INVENTION

This invention relates to the plugging of a more permeable zone of a subterranean formation. More particularly, the invention relates to a novel method of forming a silica cement in-situ which covers a substantial areal extent of a more permeable zone. This method is especially useful in promoting more uniform fluid injection patterns so as to tolerate neutral pH or high temperature steam or while conducting a steam-flooding, carbon dioxide stimulation or fire flooding enhanced oil recovery (EOR) operation in a lesser permeability zone.

BACKGROUND OF THE INVENTION

Steam or fire stimulation recovery techniques are used to increase production from an oil-bearing formation. In steam stimulation techniques, steam is used to heat a section of a formation adjacent to a wellbore so that production rates are increased through lowered oil viscosities.

In a typical conventional steam stimulation injection cycle, steam is injected into a desired section of a reservoir or formation. A shut-in (or soak phase) may follow, in which thermal energy diffuses through the formation. A production phase follows in which oil is produced until oil production rates decrease to an uneconomical amount. Subsequent injection cycles are often used to increase recovery.

Steam stimulation techniques recover oil at rates as high as 80–85% of the original oil in place in zones at which steam contacts the reservoir. However, there are problems in contacting all zones of a formation due to heterogeneities in the reservoir, such as high/low permeability streaks, which may cause steam fingering. When any of these heterogeneities are present in a reservoir, the efficiency of a process begins to deteriorate due to reduced reservoir pressure, reservoir reheating, longer production cycles and reduced oil-steam ratios. As a result, steam stimulation may become unprofitable.

Various methods have been proposed so that steam can be diverted to uncontacted zones of a formation. One such method is disclosed in U.S. Pat. No. 2,402,588 which issued to Andersen. Andersen disclosed a method of filling a more permeable zone of a reservoir by injecting a dilute alkaline solution of sodium silicate under low pressure. An acid gas such as carbon dioxide is then injected to reduce the alkalinity of the solution, which results in the forming of a silica gel.

Another method is disclosed in U.S. Pat. No. 3,645,446 which issued to Young et al. Young discloses the plugging of a zone of a reservoir by injecting a mixture of steam and sodium silicate into the permeable zone. A second mixture containing steam and a gelling agent such as carbon dioxide is injected into the permeable zone and the two mixtures are allowed to react. A hard silica gel plug is formed.

Another method is disclosed in U.S. Pat. No. 3,805,893 which issued to Sarem. Sarem discloses the formation of a gelatinous precipitate by injecting small slugs of a dilute aqueous alkali metal silicate solution, followed by water and then a dilute aqueous solution of a water-soluble material which reacts with the alkali metal silicate to form a precipitate. The precipitate hardens to form a substantially impermeable substance. A water-flooding oil recovery method is then conducted in a lower permeability zone.

Christopher discloses another method in U.S. Pat. No. 3,965,986. In this method, a slug of liquid colloidal silica and water is injected into a reservoir. This slug has a relatively low viscosity. A surfactant is next injected therein which forms a gel on contact with the silica slug.

Amino resins such as melamine formaldehyde resins are cross-linked with certain polymers to make gels useful as profile control agents for high temperature reservoirs during a water-flooding operation. These gels are disclosed in U.S. Pat. No. 4,834,180 which issued to Shu on May 30, 1989. These gels are unable to withstand high temperatures encountered during a fire-flooding enhanced oil recovery operation.

Therefore, what is needed is a method for consolidating a high permeability zone of a formation while controlling the permeability of that zone with a natural silica cementing material so as to enable the conducting of an EOR method such as a steam-flooding, carbon dioxide-flooding, water-flooding or fire-flooding operation in a zone of lesser permeability where high temperatures and pH's of 7.0 or less are encountered.

SUMMARY

This invention is directed to a method for permeability profile control where a steam-flooding, water-flooding, carbon dioxide flooding, or fire-flooding EOR operation is utilized or where high temperatures and pH's of 7.0 or less are encountered. In the practice of this invention, an aqueous alkali metal hydroxide, ammonium hydroxide, or organoammonium hydroxide solution is injected into a higher permeability zone of the formation. Hydroxide solution is prevented from entering a zone of lower permeability by utilization of a mechanical packer. As the hydroxide solution enters the higher permeability zone, it saturates said zone while depositing a film of the solution on sand grains contained in said zone.

Afterwards, a spacer volume of a water-miscible organic solvent is directed into said zone. This organic solvent s selected from a member of the group consisting of methanol, ethanol, higher alcohols, ketones, tetrahydrafuran, and dimethyl sulfoxide.

After a spacer volume of solvent has been placed into the higher permeability zone, a water-miscible organic solvent containing an alkylpolysilicate is next injected into the higher permeability zone. Upon coming into contact with the hydroxide solution surrounding the sand grains in the higher permeability zone, alkylpolysilicate reacts with the hydroxide solution to form a silica cement in-situ. The silica cement which is formed is stable at neutral or low pH's and temperatures in excess of about 200° F. These above steps can be repeated until the zone has been closed to the extent desired. Thereafter, a steam stimulation, carbon dioxide stimulation, water-flooding, or fire-flooding EOR operation s initiated in a zone of lower permeability in said formation to remove hydrocarbonaceous fluids therefrom.

By controlling the concentration and rate of injection of the hydroxide solution and the organic solvent containing the alkylpolysilicate which are injected into the higher permeability zone, the higher permeability zone of the formation can be closed to fluid flow.

It is therefore an object of this invention to provide for a method of making a silica cement in-situ for controllably plugging or closing a higher permeability zone within a formation which cement is more natural to a formation's environment.

It is even another object of this invention to consolidate a loosely consolidated zone in a formation while controlling the profile in that zone.

It is another object of this invention to provide for a composition which will ensure an even flow front and a homogeneous consolidation when closing a high permeability zone where neutral or low pH's or high temperatures are encountered.

It is a further object of this invention to provide for a simple process for blocking a zone which tolerates residual oil and formation brine while making a silica cement in-situ while controlling the distribution and setting of said cement.

It is a still yet further object of this invention to provide for a formation profile control method which can be reversed by treating the consolidated interval with an alkali solution.

It is an even still yet further object of this invention to provide for a formation consolidation agent which is resistant to high temperatures and neutral or low pH's.

It is a yet even still further object of this invention to provide for a simple process for closing a higher permeability zone in a formation which method avoids complex procedures of cleaning and removing water from said zone.

BRIEF DESCRIPTION OF THE PREFERRED EMBODIMENT

This invention concerns an improvement in the sweep efficiency of an EOR process by injecting sequentially solutions sufficient to form a silica cement in-situ in a higher permeability zone of a formation so as to close an oil-depleted zone. When a need to close the higher permeability zone has been determined, an aqueous solution containing an alkali metal hydroxide, ammonium hydroxide or an organoammonium hydroxide is injected into the higher permeability zone. Once the hydroxide has progressed into the higher permeability zone to the extent desired, a spacer volume of a water-miscible organic solvent is next injected into the higher permeability zone to separate the aqueous hydroxide solution from an organic solvent containing an alkylpolysilicate. Afterwards, a water-miscible organic solvent with the alkylpolysilicate therein is injected into the higher permeability zone where it reacts with the hydroxide solution to form a silica cement in-situ.

Figure 1:
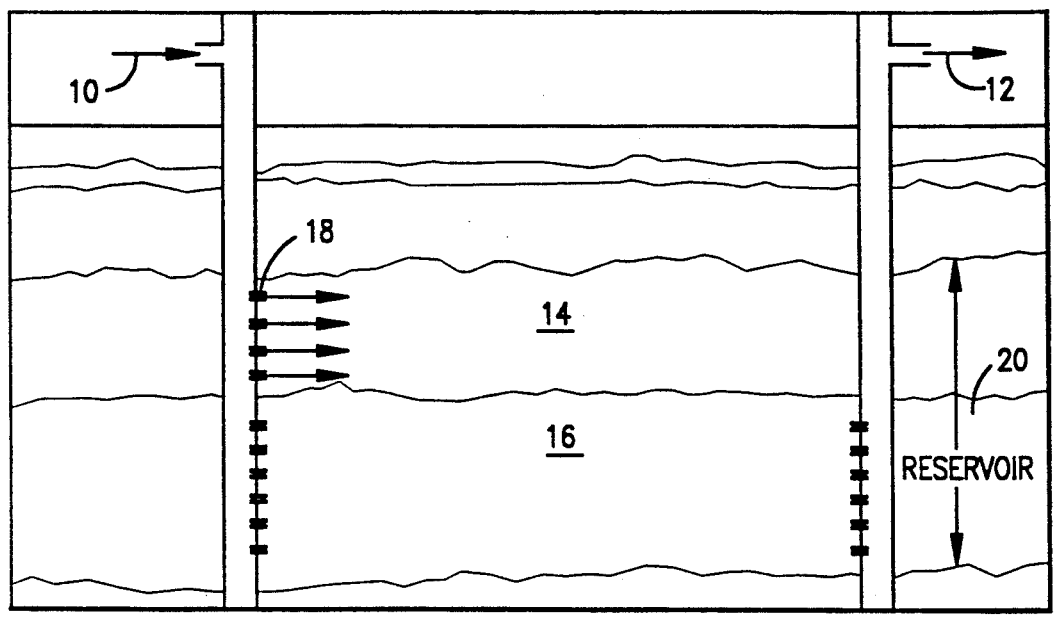
FIG. 1 is a schematic illustration which shows placement of the components of this invention in a higher permeability zone of a formation.
Figure 2:
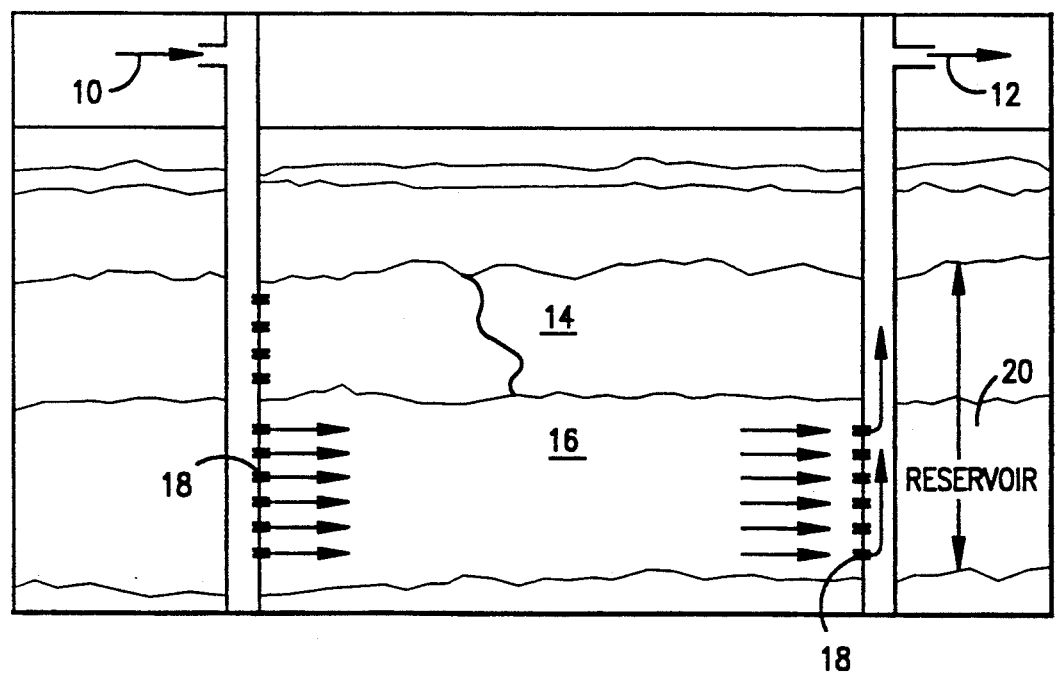
FIG. 2 is a schematic illustration which depicts a higher permeability zone closed with the composition of this invention while an enhanced oil recovery (EOR) method is being initiated in a lower permeability zone.

Referring to FIG. 1, the aqueous hydroxide solution is injected into injector well 10 where it enters higher permeability zone 14 of reservoir 20 through perforations 18. Thereafter, a spacer volume of a water-miscible organic solvent is injected into zone 14. Afterwards, a water-miscible organic solvent containing an alkylpolysilicate therein is injected into higher permeability zone where it forms a silica cement in-situ which is stable to temperatures up to and in excess of about 200° F. Once the silica cement has hardened and higher permeability zone 14 has been consolidated and plugged to the extent desired, by repeated applications if necessary, an EOR operation is initiated into lower permeability zone 16 as is shown in FIG. 2. A flooding medium used in the EOR operation exits reservoir 20 by perforations 18 into producer well 12.

The alkali metal hydroxide utilized herein comprises sodium, potassium, or lithium ions and mixtures thereof. Sodium and potassium hydroxide comprise the preferred inorganic hydroxides. The concentration of the hydroxide solution is about 20 to about 60 wt. percent, preferably about 30 wt. percent. As will be understood by those skilled in the art, the exact concentration should be determined for each application. Similar concentrations of ammonium hydroxide and organoammonium hydroxide can be used. Preferably, organoammonium hydroxides should have $C_1$ through $C_{10}$ alkyl or aryl groups, with or without other hetero atoms containing moieties such as sulfur or oxygen. Tetramethylammonium hydroxide is preferred.

After the aqueous hydroxide solution has been injected into the higher permeability zone, a spacer volume of a water-miscible organic solvent is directed into zone 14. This spacer volume of organic solvent separates the aqueous hydroxide solution from a subsequently injected organic solvent solution containing an alkylpolysilicate.

This spacer volume of organic solvent is selected from a member of the group consisting of methanol, ethanol, higher alcohols, ketones, tetrahydrofuran, and dimethyl sulfoxide. Solvents used as a spacer volume can be of an industrial grade. Utilization of the spacer volume should be kept to a minimum in order to obtain a higher degree of plugging. If residual permeability is desired, the volume of solvent slug utilized should be reduced.

Ketones which can be used herein include symmetric or simple aliphatic ketones, such as acetone and unsymmetric aliphatic or mixed aliphatic-aromatic ketones such as methylethylketone and acetophenone. In the interest of economy, industrial grades of these ketones can be utilized.

Higher alcohols which can be used herein include those having $C_3$ through $C_{10}$ alkyl or aryl groups with or without other moieties containing hetero atoms.

After placing the spacer volume of organic solvent into the higher permeability zone, an alkylpolysilicate water-miscible organic solvent is directed into the higher permeability zone. The organic solvent containing the alkylpolysilicate can be the same as used for the spacer solvent. This alkylpolysilicate reacts with the hydroxide solution thereby forming a silica cement in-situ which consolidates and controls permeability in the higher permeability zone. Injection of the aqueous organoammonium hydroxide, alkali metal or ammonium hydroxide, spacer volume of solution, and alkylpolysilicate can be repeated until the higher permeability zone is consolidated and plugged to a desired extent.

In order to increase the cement's consolidation and plugging ability, the concentration of the aqueous hydroxide slug or the alkypolysilicate contained in the organic solvent slug can be increased. Similarly, the flow rates of each of these slugs through the higher permeability zone can be decreased to obtain better consolidation and plugging strength. A decreased flow rate is particularly beneficial for increasing consolidation or plugging and controlling permeability when the alkylpolysilicate slug's flow rate is decreased. As will be understood by those skilled in the art, optimal concentrations and flow rates are formation dependent. Therefore, optimal concentrations and flow rates should be geared to field conditions and requirements.

As the aqueous hydroxide solution or slug proceeds through higher permeability zone 14, it deposits a film of said hydroxide on sand grains therein. A spacer volume of the solvent is directed through zone 14 so as to separate the aqueous hydroxide slug from the so vent solution containing the alkylpolysilicate. The solvent solution of alkylpolysilicate is injected into zone 14 in a concentration and at a rate sufficient to bind and consolidate the sands in zone 14 thereby closing or plugging said zone by forming a silica cement therein. Ethanol is the preferred water-miscible organic solvent. Of course, other higher alcohols can be used. Alkylpolysilicates which are used herein are contained in the organic solvent in an amount of from about 10 to about 90 weight percent sufficient to react with the aqueous hydroxide to form a silica cement.

After the higher permeability zone has been consolidated and the permeability reduced to the extent desired, a thermal oil recovery, carbon dioxide stimulation process or water-flooding EOR method is initiated into a zone of lesser permeability within the formation and hydrocarbonaceous fluids are removed therefrom. The formations which are plugged and consolidated can include unconsolidated or loosely consolidated ones. Unconsolidated sand formations are also included. While the EOR method is being conducted in the lower permeability zone, temperatures within that zone may exceed about 400° F. This zone may also have a pH of 7 or less. A method for the selective placement of polymer gels for profile control in a thermal oil method is discussed in U.S. Pat. No. 4,804,043 which issued to Shu et al. on Feb. 14, 1989. This patent is hereby incorporated by reference herein.

Steam-flooding processes which can be utilized when employing this profile control method described herein are detailed in U.S. Pat. Nos. 4,489,783 and 3,918,521 which issued to Shu and Snavely, respectively. U.S. Pat. No. 4,479,894 that issued to Chen et al. describes a water-flooding process that can be used herein. Fire-flooding processes which can be utilized herein are disclosed in U.S. Pat. Nos. 4,440,227 and 4,669,542 which issued to Holmes and Venkatesan, respectively. These patents are hereby incorporated by reference herein.

A carbon dioxide EOR process which can be used after consolidating the higher permeability zone is disclosed in U.S. Pat. No. 4,513,821 which issued to W.R. Shu on Apr. 30, 1985. This patent is hereby incorporated by reference herein.

The silica cement which is formed can withstand pH's lower than about 7 and temperatures up to and in excess of about 200° F.

Alkylpolysilicate preferred for use herein is the hydrolysis condensation product of alkylorthosilicate according to the reaction equation below:

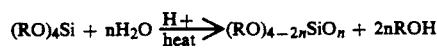

where
$n \leq 2$
$R = C_1-C_{10}$

R should be $\leq 10$ carbons for good solubility and high $SiO_2$ content.

Tetramethyl or tetraethylorthosilicates (EPS) are preferred. Mixed alkylorthosilicate can also be used. It is desirable to obtain an alkylpolysilicate with $n > 0.5$, preferably greater than about 1. As n increases, the $SiO_2$ content increases, resulting in stronger consolidation. It is desirable to use an alkylpolysilicate with a silica content of 30% or more, preferably about 50 wt. %. EPS which are used herein are placed into one of the organic solvents mentioned above. The preferred solvent is ethanol. Of course, other alcohols can be used. EPS or other alkylpolysilicates are contained in the solvent in an amount of from about 10 to about 90 weight percent sufficient to react with the silicates contained in the aqueous solution. Although alcohol is the solvent preferred because of its versatility and availability, other water-miscible organic solvents can be utilized. These solvents include methanol and higher alcohols, ketones, tetrahydrofuran, and dimethyl sulfoxide, as mentioned above.

EPS is placed in a solvent comprising an alcohol. Ethanol is the preferred solvent. The preferred concentration of EPS for use is about 20 wt. percent in ethanol. A 30% potassium hydroxide solution is preferred.

Although the present invention has been described with preferred embodiments, it is to be understood that modifications and variations may be resorted to without departing from the spirit and scope of this invention, as those skilled in the art readily understand. Such variations and modifications are considered to be within the purview and scope of the appended claims.

What is claimed:

1. A profile control method for closing a zone of a formation to fluid flow, comprising:
   a) injecting into said zone an aqueous solution containing a member selected from the group consisting of an alkali metal hydroxide, ammonium hydroxide, or organoammonium hydroxide;
   b) injecting thereafter a spacer volume of a water-miscible organic solvent into said zone; and
   c) injecting afterwards into said zone a water-miscible organic solvent containing an alkylpolysilicate in an amount sufficient to react with a member from step a) thereby forming a silica cement sufficient to close said zone to fluid flow.

2. The method as recited in claim 1 where the closed zone is a higher permeability zone and where after closing :aid zone an enhanced oil recovery method is initiated in a lower permeability zone of said formation which recovery method comprises z water-flood, a steam-flood, a fire-flood, or a carbon dioxide stimulation.

3. The method as recited in claim 1 where the alkali metal hydroxide solution comprises ions of sodium, potassium, or lithium, and mixtures thereof.

4. The method as recited in claim 1 where the organic solvent solution is selected from a member of the group consisting of methanol, ethanol, higher alcohols, ketones, tetrahydrofuran, and dimethyl sulfoxide.

5. The method as recited in claim 1 where in step a) said hydroxide is contained in the aqueous solution in an amount of from about 20 to about 60 weight percent.

6. The method as recited in claim 1 where alkylpolysilicate is contained in said solution in an amount of about 10 to about 90 weight percent.

7. The method as recited in claim 1 where steps a), b) and c) are repeated until the zone of the formation has been closed to the extent desired.

8. The method as recited in claim 1 where said silica cement withstands temperatures in excess of about 200° F.

9. The method as recited in claim 1 where the silica cement withstands a temperature in excess of about 200° F. and a pH equal to about 7 or less.

10. The method as recited in claim 1 where the formation comprises unconsolidated sand.

11. The method as recited in claim 1 where in step a) the organoammonium hydroxide comprises $C_1$ to $C_{10}$ alkyl or ary groups in combination with hetero atoms containing moieties.

12. The method as recited in claim 1 where in step c) said alkylpolysilicate is the hydrolysis condensation product of alkylorthosilicate according to the equation below:

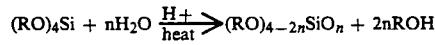

where $n \leq 2$ and $R = C_1 - C_{10}$.

13. A profile control method for closing a higher permeability zone of a formation of fluid flow, comprising:
   a) injecting into said zone an aqueous solution containing a member selected from the group consisting of an alkali metal hydroxide, ammonium hydroxide, or organoammonium hydroxide;
   b) injecting thereafter a spacer volume of a water-miscible organic solvent into said zone;
   c) injecting afterwards into said zone a water-miscible organic solvent containing an alkylpolysilicate in an amount sufficient to react with a member from step a) thereby forming a silica cement sufficient to close said zone to fluid flow; and
   d) initiating subsequently an enhanced oil recovery method in a lower permeability zone of a formation which method is a member selected from the group consisting of water-flooding, steam flooding, fire flooding, and carbon dioxide stimulation.

14. The method as recited in claim 13 where in step c) said alkylpolysilicate is the hydrolysis-condensation product of alkylorthosilicate according to the equation below:

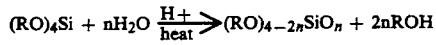

where $n \leq 2$ and $R = C_1 - C_{10}$.

15. The method as recited in claim 13 where the organic solvent is selected from a member of the group consisting of methanol, ethanol, higher alcohols, ketones, tetrahydrofuran, and dimethyl sulfoxide.

16. The method as recited in claim 13 where in step a) the organoammonium hydroxide comprises $C_1$ to $C_{10}$ alkyl or aryl groups in combination with hetero atoms containing moieties.

17. The method as recited in claim 13 where steps a), b) and c) are repeated until the higher permeability zone of the formation has been closed to the extent desired.

18. The method as recited in claim 13 where the silica cement withstands a temperature in excess of about 200° F. and a pH equal to about 7 or less.

19. The method as recited in claim 13 where the alkali metal hydroxide solution comprises ions of sodium, potassium, or lithium, and mixtures thereof.

20. The method as recited in claim 13 where in step a) said hydroxide is contained in the aqueous solution in an amount of from about 20 to about 60 weight percent.

21. The method as recited in claim 13 where alkylpolysilicate is contained in said solution in an amount of about 10 to about 90 weight percent.

22. The method as recited in claim 13 where the formation comprises unconsolidated sand.

23. The method as recited in claim 13 where said silica cement withstands temperatures in excess of about 200° F.

* * * * *